(12) United States Patent
Tian et al.

(10) Patent No.: US 9,099,950 B2
(45) Date of Patent: Aug. 4, 2015

(54) FAN SIMULATION CIRCUIT

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Bo Tian, Shenzhen (CN); Kang Wu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 31 days.

(21) Appl. No.: 14/141,455

(22) Filed: Dec. 27, 2013

(65) Prior Publication Data
US 2015/0155808 A1 Jun. 4, 2015

(30) Foreign Application Priority Data
Nov. 29, 2013 (CN) .......................... 2013 1 0618839

(51) Int. Cl.
*H02H 3/04* (2006.01)
*H02P 7/18* (2006.01)

(52) U.S. Cl.
CPC ...................................... *H02P 7/18* (2013.01)

(58) Field of Classification Search
CPC ..................................................... H02K 11/001
USPC ........................................... 318/490, 34, 558
See application file for complete search history.

(56) References Cited

U.S. PATENT DOCUMENTS 4,383,439 A * 5/1983 MacCormack et al. ... 73/114.68

* cited by examiner

*Primary Examiner* — David S Luo
(74) *Attorney, Agent, or Firm* — Novak Druce Connolly Bove + Quigg LLP

(57) ABSTRACT

A fan simulation circuit includes a connector, a voltage converter, a control chip, and a selecting module. The connector is used to output a speed signal. A power pin of the voltage converter is connected to a first voltage input terminal. An output pin of the voltage converter is connected to a speed pin of the connector through a first resistor. The output pin is also connected to a second voltage input terminal through the first resistor and a second resistor in that order. The selecting module is used to output high or low-level signals to the control chip. The control chip outputs different speed signals to an input pin of the voltage converter. The voltage converter converts the speed signals and outputs converted speed signals to the speed pin of the connector.

6 Claims, 1 Drawing Sheet

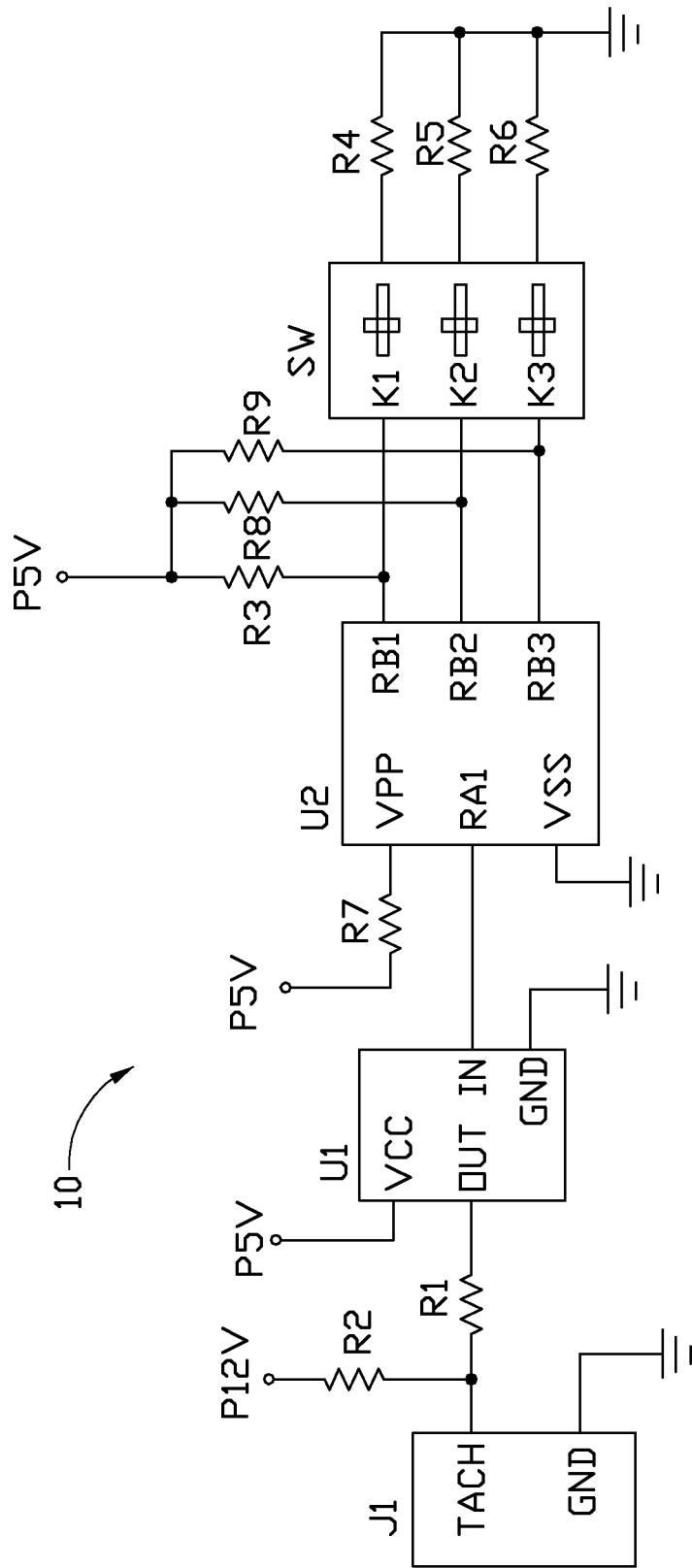

FAN SIMULATION CIRCUIT

BACKGROUND

1. Technical Field

The present disclosure relates to a circuit for simulating fans.

2. Description of Related Art

A fan monitor board is used to monitor rotational speeds of fans of a server. When testing the fan monitor board, the fan monitor board must receive speed signals from the fans. However, not all fans can output speed signals, so it may be difficult to test the fan monitor board.

Therefore, there is room for improvement in the art.

BRIEF DESCRIPTION OF THE DRAWING

Many aspects of the present disclosure can be better understood with reference to the following drawing(s). The components in the drawing(s) are not necessarily drawn to scale, the emphasis instead being placed upon clearly illustrating the principles of the present disclosure. Moreover, in the drawing(s), like reference numerals designate corresponding parts throughout the several views.

The FIGURE is a circuit diagram of an embodiment of a fan simulation circuit of the present disclosure.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

The FIGURE shows an embodiment of a fan simulation circuit 10 of the present disclosure.

The fan simulation circuit 10 comprises a connector J1, a voltage converter U1, a control chip U2, and a selecting module SW. The fan simulation circuit 10 is arranged on a fan monitor board. The fan monitor board receives speed signals output by the fan simulation circuit from a speed pin TACH of the connector J1.

A power pin VCC of the voltage converter U1 is connected to a first voltage input terminal P5V. An output pin OUT of the voltage converter U1 is connected to a second voltage input terminal P12V through a first resistor R1 and a second resistor R2 in that order. A node between the first resistor R1 and the second resistor R2 is connected to the speed pin TACH of the connector J1. A ground pin GND of the connector J1 is grounded. A ground pin GND of the voltage converter U1 is grounded. A signal output pin RA1 of the control chip U2 is connected to an input pin IN of the voltage converter U1. A power pin VPP of the control chip U2 is connected to the first voltage input terminal P5V through a seventh resistor R7. A ground pin VSS of the control chip U2 is grounded.

The selecting module SW comprises switches K1, K2, and K3. A first input pin RB1 of the control chip U2 is grounded through the switch K1 and a fourth resistor R4 in that order. The first input pin RB1 of the control chip U2 is also connected to the first voltage input terminal P5V through a third resistor R3. A second input pin RB2 of the control chip U2 is grounded through the switch K2 and a fifth resistor R5 in that order. The second input pin RB2 of the control chip U2 is also connected to the first voltage input terminal P5V through an eighth resistor R8. A third input pin RB3 of the control chip U2 is grounded through the switch K3 and a sixth resistor R6 in that order. The third input pin RB3 of the control chip U2 is also connected to the first voltage input terminal P5V through a ninth resistor R9. The control chip U2 outputs signals indicating different speeds to the first input pin IN of the voltage converter U1 corresponding to high or low level signals received by the first, second, and third input pins RB1, R2, and RB3. Operation voltages of the connector J1 and of the control chip U2 are different. The voltage converter U1 converts the signals from the control chip U2 and outputs the converted signals through the output pin OUT to the connector J1.

In one embodiment, when the switches K1 and K2 are turned on and the switch K3 is turned off, the first and second input pins RB1 and RB2 receive low level signals, such as logic 0, and the third input pin RB3 receives a high level signal, such as logic 1. The control chip U2 outputs a first signal indicating a first speed to the voltage converter U1 through the first output pin RA1. The voltage converter U1 converts the first signal and outputs the converted first signal to the speed pin TACH of the connector J1. When the switches K1 and K3 are turned on and the switch K2 is turned off, the first and third input pins RB1 and RB3 receive the low level signals, and the second input pin RB2 receives the high level signal. The control chip U2 outputs a second signal indicating a second speed to the voltage converter U1 through the first output pin RA1. The voltage converter U1 converts the second signal and outputs the converted second signal to the speed pin TACH of the connector J1. The fan monitor board receives the first and second signals from the connector J1 and displays the first and second speeds. The control chip U2 outputs signals indicating different speeds corresponding to signals received by the first, second, and third input pins RB1, RB2, and RB3. Therefore, the fan simulation circuit 10 can simulate fans operating at different speeds.

In one embodiment, the switches K1, K2, and K3 are toggle switches. Resistances of the fourth, fifth, and sixth resistors R4, R5, and R6 are about 100 ohms. Resistances of the third, eighth, and ninth resistors R3, R8, and R9 are about 10 kiloohms.

While the disclosure has been described by way of example and embodiments, it is to be understood that the disclosure is not limited thereto. To the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A fan simulation circuit, comprising:
   a connector comprising a speed pin;
   a control chip comprising a signal output pin, a power pin, a ground pin, and a plurality of input pins, wherein the signal output pin of the control chip is connected to the speed pin of the connector, the power pin of the control chip is connected to a first voltage input terminal, the ground pin of the control chip is grounded; and
   a selecting module comprising a plurality of switches, wherein each of the plurality of input pins of the control chip is grounded through a corresponding one of the plurality of switches, and is connected to the first voltage input terminal through a resistor, wherein the signal output pin of the control chip outputs signals indicating different speeds to the speed pin of the connector corresponding to signals received by the plurality of input pins of the control chip.

2. The fan simulation circuit of claim 1, further comprising a resistor connected between each switch and ground.

3. The fan simulation circuit of claim 1, further comprising a voltage converter, wherein the voltage converter comprises an input pin, an output pin, a power pin, and a ground pin, wherein the power pin of the voltage converter is connected to the first voltage input terminal, the output pin of the voltage converter is connected to a second voltage input terminal through a first resistor and a second resistor in that order, a node between the first and second resistors is connected to the speed pin of the connector, the ground pin of the voltage converter is grounded, the signal output pin of the control chip is connected to the input pin of the converter, the voltage converter converts the signals from the control chip and outputs converted signals to the speed pin of the connector through the output pin.

4. A fan simulation circuit, comprising:
a connector comprising a speed pin;
a control chip comprising a signal output pin, a power pin, a ground pin, and an input pin, wherein the signal output pin of the control chip is connected to the speed pin of the voltage converter, the power pin of the control chip is connected to a first voltage input terminal, the ground pin of the control chip is grounded; and
a selecting module comprising a switch, wherein the input pin of the control chip is grounded through the switch, and is connected to the first voltage input terminal through a resistor, wherein the signal output pin of the control chip outputs signals indicating different speeds to the speed pin of the connector corresponding to signals received by the input pin of the control chip.

5. The fan simulation circuit of claim 4, further comprising a resistor connected between the switch and ground.

6. The fan simulation circuit of claim 4, further comprising a voltage converter, wherein the voltage converter comprises an input pin, an output pin, a power pin, and a ground pin, wherein the power pin of the voltage converter is connected to the first voltage input terminal, the output pin of the voltage converter is connected to a second voltage input terminal through a first resistor and a second resistor in that order, a node between the first and second resistors is connected to the speed pin of the connector, the ground pin of the voltage converter is grounded, the signal output pin of the control chip is connected to the input pin of the converter, the voltage converter converts the signals from the control chip and outputs converted signals to the speed pin of the connector through the output pin.

\* \* \* \* \*